B. G. LAMME.
METHOD OF OPERATING INDUCTION MOTORS.
APPLICATION FILED JULY 6, 1908.

1,074,125.

Patented Sept. 30, 1913.

WITNESSES:
C. L. Belcher
Otto S. Schairer

INVENTOR
Benjamin G. Lamme
BY
Wesley G. Carr
ATTORNEY

UNITED STATES PATENT OFFICE.

BENJAMIN G. LAMME, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

METHOD OF OPERATING INDUCTION-MOTORS.

1,074,125.  Specification of Letters Patent.  Patented Sept. 30, 1913.

Application filed July 6, 1908.  Serial No. 442,221.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Methods of Operating Induction-Motors, of which the following is a specification.

My invention relates to induction motors, and it has for its object to provide a method of starting or operating polyphase induction motors that obviates the necessity for employing auto-transformers in connection therewith.

Figure 1:
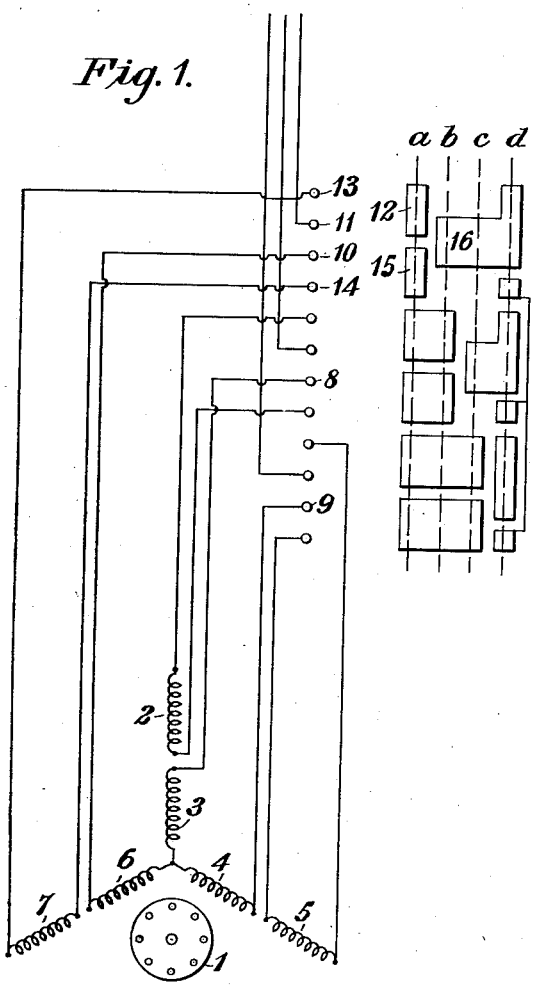

Figure 1 of the accompanying drawings is a diagrammatic view of a motor and a controller adapted for practising my invention, and Figs. 2, 3, 4 and 5 are diagrams illustrating the connections of the motor windings for the various positions of the controller.

Figure 3:
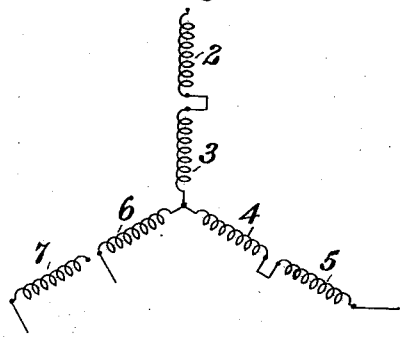
Figure 4:
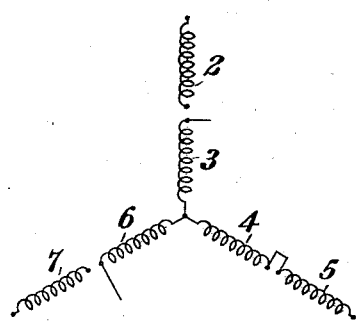

The motor comprises a secondary member 1, of the "squirrel-cage" or other suitable type, and a primary winding divided into six sections 2, 3, 4, 5, 6 and 7, two for each phase, the sections 3, 4 and 6 being connected in star arrangement with their terminals connected respectively to contact terminals 8, 9 and 10 of the controller. The remaining sections of the primary winding are connected, respectively, between different pairs of contact terminals of the controller in such a manner that when the contact terminals engage the movable contact segments of the controller along the broken line $a$, the sections of each phase of the winding will be connected in series relation. The relation will be better understood by tracing the circuit through one phase of the winding, which is by way of devices bearing reference characters 11, 12, 13, 7, 14, 15, 10 and 6, the circuits for the other phases of the winding being similar thereto. In the position $b$ of the controller, section 7 of the primary winding of the motor is removed from circuit, the outer terminal of the section 6 being then directly connected to the distributing circuit, as shown in Fig. 3, and as will be understood by tracing the circuit through devices bearing reference characters 11, 16, 10 and 6. In passing from position $b$ to position $c$ of the controller, section 2 of the primary winding of the motor is also removed from circuit and the outer terminal of the section 3 is connected directly to the distributing circuit. In the position $d$ of the controller, sections 3, 4 and 6 of the primary winding of the motor are connected in star arrangement directly to the distributing circuit and the sections 2, 5 and 7 are also connected in star arrangement directly to the distributing circuit, the two sets of star-connected sections being entirely independent of each other, this latter arrangement being shown in Fig. 5.

Figure 2:
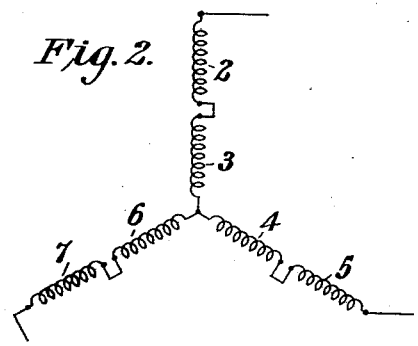
Figure 5:
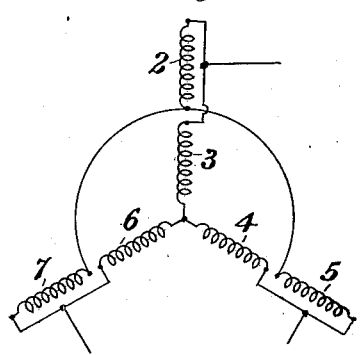

With the arrangement shown in Fig. 2, the torque exerted is approximately 25% of the normal torque of the motor; namely, that obtained with the arrangement shown in Fig. 5, since it is equivalent to applying one-half of the normal voltage to the motor. With the arrangement shown in Fig. 3, from 35 to 40% of the normal torque of the motor is obtained, and with that shown in Fig. 4 from 65 to 70% of the normal torque is obtained. Although, with the latter two arrangements, some unbalancing of the currents in the several phases of the winding occurs, it has been found that the torques exerted are only slightly reduced on that account. In practice, it may be unnecessary or undesirable to provide as many gradations in the starting torque of the motor as are provided for in Fig. 1, and for that reason either of the arrangements that give unbalanced conditions may be omitted.

I claim as my invention:

1. The method of starting a polyphase induction motor having a primary winding comprising a plurality of sections for each phase of current which consists in first making a supply-circuit connection for each phase of current, with the sections corresponding to a plurality of phases connected in series relation, then successively cutting out a section corresponding to each of a plurality of phases, and finally connecting one terminal of each section to the supply circuit and the remaining terminals of the respective sections to force two independent groups.

2. The method of starting a polyphase induction motor having a primary winding comprising a plurality of sections for each phase of current which consists in first connecting the sections corresponding to each phase in series relation, then cutting out a section or sections corresponding to one or
5 more phases, and finally connecting the sections in two independent star-connected groups.

In testimony whereof, I have hereunto subscribed my name this 30th day of June, 1908.

BENJ. G. LAMME.

Witnesses:
ELIZABETH LIVINGSTONE,
BIRNEY HINES.

---

It is hereby certified that in Letters Patent No. 1,074,125, granted September 30, 1913, upon the application of Benjamin G. Lamme, of Pittsburgh, Pennsylvania, for an improvement in "Methods of Operating Induction-Motors," an error appears in the printed specification requiring correction as follows: Page 1, line 100, for the word "force" read *form;* and that the said Letters Patent should be read with this correction therein that the same may conform to the record of the case in the Patent Office.

Signed and sealed this 28th day of October, A. D., 1913.

[SEAL.]

THOMAS EWING,
*Commissioner of Patents.*